United States Patent [19]

Cayton, Jr.

[11] 3,781,018

[45] Dec. 25, 1973

[54] TAPE HEAD INDEXING AND SHIFTING APPARATUS

[75] Inventor: Thomas C. Cayton, Jr., Chicago, Ill.

[73] Assignee: Motorola, Inc., Franklin Park, Ill.

[22] Filed: Oct. 4, 1971

[21] Appl. No.: 186,160

[52] U.S. Cl. ........................ 274/4 A, 74/435, 74/393
[51] Int. Cl. ............................................ G11b 5/56
[58] Field of Search .......................... 274/4 A, 11 A; 179/100.2 CA; 74/435, 393

[56] References Cited

UNITED STATES PATENTS 3,575,422 4/1971 Peltz .................................. 274/4 A
3,584,878 6/1971 Seregni ............................. 274/4 A
3,663,022 5/1972 Ban .................................... 274/4 A

*Primary Examiner*—Louis R. Prince
*Assistant Examiner*—A. J. Mirabito
*Attorney*—Mueller and Aichele

[57] ABSTRACT

Apparatus utilizing the capstan flywheel of a multi-track tape recorder and/or reproducer to power apparatus for shifting the transducer head from one tape track to another, including gear means linking the flywheel to the cam which shifts the position of the transducer head, and a solenoid activated at the end of a tape track, causes engagement of the gear linkage, and means for automatically disengaging the shifting apparatus after the transducer head has been shifted and readying the same for future shifting.

4 Claims, 5 Drawing Figures

TAPE HEAD INDEXING AND SHIFTING APPARATUS

BACKGROUND OF THE INVENTION

Multi-track tape recorders and/or reproducers require shifting either the transducer head of the recorder and/or reproducer from one tape track to another or shifting the tape itself. In practice the head is mechanically shifted from one tape track to another by either manual or automatic means. Manual switches for shifting the position of the transducer head necessarily cannot provide automatic and continuous playing of all the tape tracks.

Automatic shifting can provide continuous playing of all tape tracks with an electromechanical apparatus employed which generally includes a ratchet secured to the cam and a pawl activated by a plunger-solenoid for operating the ratchet to shift the head position. The total power for driving the pawl and ratchet, and thus for shifting the transducer head, comes directly from the solenoid. In order to provide this power the solenoid has to be relatively large and therefore expensive. This type of device may also result in unsatisfactory power drainage, for in order to provide sufficient force a large current is needed. Space requirements for the high power solenoid and related apparatus presents an additional problem.

SUMMARY OF THE INVENTION

It is an object of the present invention to provide improved apparatus for utilizing the capstan flywheel device of a multi-track tape recorder and/or reproducer for shifting the transducer head from one tape track to another.

It is another object of the present invention to provide apparatus requiring less electrical power than normally required for actuating apparatus for shifting the transducer head from one tape track to another in a multi-track tape recorder and/or reproducer.

It is a further object of the present invention to provide economical apparatus for shifting the transducer head of a multi-track tape recorder and/or reproducer, which requires less space than normally required for shifting apparatus.

In one embodiment of the invention first and second gears are rotatably mounted to the capstan flywheel shaft. An actuating arm pivotally mounted to the chassis is locked in a disengaged condition by a spring mounted rod which is inserted through a bracket and supports the arm at the end opposite the pivot. A solenoid when activated at the end of one tape track causes the rod to be withdrawn with the spring causing the actuating arm to pivot to an engaged position to block the locking rod. Third and fourth meshed gears are rotatably mounted to the actuating arm, and with the arm in the engaged position the third gear meshes with the second gear and the fourth gear meshes with a fifth gear, which is rotatably attached to the cam shaft. The fifth gear has alternating segments of gear teeth and tabs with a segment of gear teeth engaging the fourth gear for rotation in the engaged condition. A sixth gear is also rotatably mounted on the cam shaft and has alternating segments of gear teeth and recesses. This sixth gear is rotated with the cam shaft being moved by the fifth gear until a section of gear teeth meshes with the first gear. The sixth gear is then driven by the first gear and also by the fifth gear through the cam shaft. A tab of the fifth gear subsequently engages the fourth gear and deactivates the actuating arm by lifting the arm so that the rod springs back to the locked position. The sixth gear continues to be rotated by the first gear until the teeth of the latter encounter a recessed segment of the sixth gear, at which time the cam shaft ceases to turn and the head shifting is complete. The apparatus is then ready to again be actuated.

In a second embodiment of the invention a first gear rotatably mounted to the capstan flywheel shaft is engageable both with a second gear, which is rotatably connected to the cam shaft, and a third gear coaxially connected to the second gear by springs. Both second and third gears have corresponding alternating segments of gear teeth and recesses. An actuating device includes an arm and pawl for engaging the gear teeth of the third gear. A solenoid when activated causes the arm to slidably move along a pivot rod and pivot thereon due to the action of a single spring having one end secured to the arm and the other anchored. This action causes engagement of the pawl with the gear teeth of the third gear which is rotated until a segment of gear teeth engages the first gear after which the solenoid is deactivated and the spring acts to return the arm to the inactive position. Corresponding tabs project from the interfaces of both the second and third gears. These corresponding tabs are joined together by spring means. With the third gear rotating, the tabs thereon cause the springs to compress and effectively engage the tabs of the second gear. The second gear then rotates with the third gear until a gear segment of the second gear engages the first gear at which time the second gear is driven by the flywheel and a toothless segment of the third gear disengages the third gear from the flywheel gear permitting the spring to expand to effectively disengage the second and third gears. A toothless segment of the second gear then disconnects the gear from the first gear with the cam having been shifted to a new position.

DETAILED DESCRIPTION

Figures 1, 2, 3:
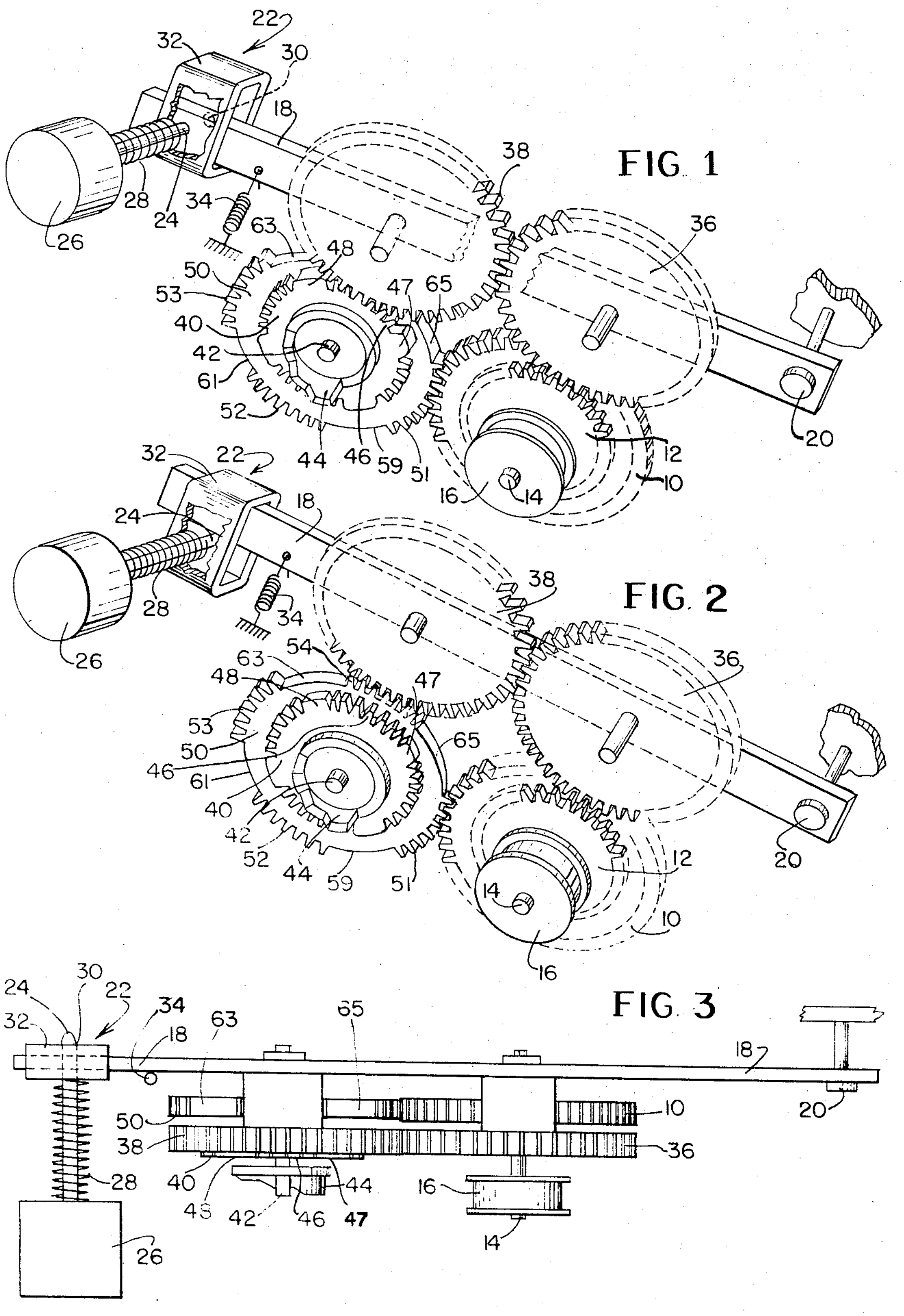
FIG. 1 is a perspective view of the present invention in the activated condition.
FIG. 2 is a perspective view of the present invention in the deactivated condition.
FIG. 3 is front elevation view of the present invention.

Referring to FIGS. 1 and 2, there is illustrated a gear train which is utilized to link the capstan flywheel drive of a tape player for playing multi-track tapes to the player tape head positioning cam. When in the engaged condition the linkage rotates the cam to position the head in the known manner. Two gears 10 and 12 are rotatably mounted on the capstan shaft 14 (FIGS. 1 and 2) which is connected to the capstan flywheel 16. Both gears 10 and 12 are secured to the capstan shaft 14 to maintain constant rotation therewith. One end of an actuating arm 18 is pivotally mounted to the chassis of the tape recorder and/or reproducer by a pivot pin 20 while the other end engages an actuating device 22 consisting of a bracket 32 and an iron rod 24 which is mounted on solenoid 26 along with spring 28. The rod 24 engages aperture 30 of bracket 32 (FIGS. 2, 3) of the actuating device 22 in the inactive position. In this position the actuating arm 18 abuts rod 24 which prevents the arm from swinging to the engaged condition, consequently rod 24 functions as a locking device. The spring 34 (FIGS. 2 and 3) causes the actuating arm 18 to pivot on pin 20 to the engaged condition when the solenoid 26 is activated at a predetermined event such as the end of one tape track as is well known in the art, and the rod 24 is magnetically withdrawn from the bracket 32 into the solenoid 26 (FIG. 1). Thereafter the solenoid 26 becomes deactivated and the arm 18 blocks spring biased locking rod 24 so that it is prevented from springing back to its locked position.

With the actuating arm 18 in the engaged condition two meshed gears 36 and 38 rotatably mounted on the arm provide linkage between gear 12, secured to the capstan shaft, and gear 40, which is rotatably mounted on the cam shaft 42.

A segment of gear teeth 46 of gear 40 engages gear 38 to drive the same. Gear 38 becomes unmeshed from the gear teeth 46 when, during rotation thereof, it engages a tab 48 of gear 40 thereby forcing the actuating arm 18 into the inactive position and allowing rod 24 to spring through hole 30 of bracket 32 to lock arm 18 in the inactive position. Spring 34, however, continues to be under tension while actuating arm 18 is deactivated.

Gear 50 has alternating segments of gear teeth 51, 52, 53, 54 and recesses 59, 61, 63, 65 positioned in a spaced relationship with the gear teeth and tabs on gear 40. When gear 40 is engaged and turned by gear 38, gear 50 also turns since it is rotatably mounted to the cam shaft 42. The segments of gear teeth and recesses of gear 50 are spaced so that while gear 40 is engaging gear 38 in rotation, gear 50 is advanced to a point where the segment 51 of gear teeth meshes with gear 10. The cam is no longer driven indirectly by the gear linkage means, but is also driven directly by the capstan shaft 14 through gear 10 and gear teeth 51. The direct drive between gear teeth 51 and gear 10 continues after gear 38 engages a tab 47 and the actuating arm 18 is disengaged. Finally, a recess 65 of gear 50 disengages gear 10 and gear 50 discontinues its rotation. A shift from one tape track to another is completed, and the device is automatically deactivated.

The driving force for shifting the cam means comes solely from the capstan flywheel driver, which continues to turn even with the shifting means disengaged. The only power expended in shifting the head in addition to that derived from the flywheel is the solenoid power required to retract rod 24 into the solenoid 26 to unlock actuating rod 18. The tension of the spring 28 controls the amount of power necessary, and thus also the size of the solenoid. Consequently in comparison to conventional shifting devices utilizing a pawl and ratchet assembly requiring continuous electrical power for shifting the transducer head, the size of the solenoid of the present invention may be substantially reduced. The short term use of the solenoid also reduces power consumption.

The gearing device including the actuating arm 18 fits into a compact area in relation to the capstan flywheel 16 and cam 44. Because of reduced power requirements, solenoid 26 is smaller than those utilized in conventional shifting arrangements and consequently requires less space.

Figure 4:
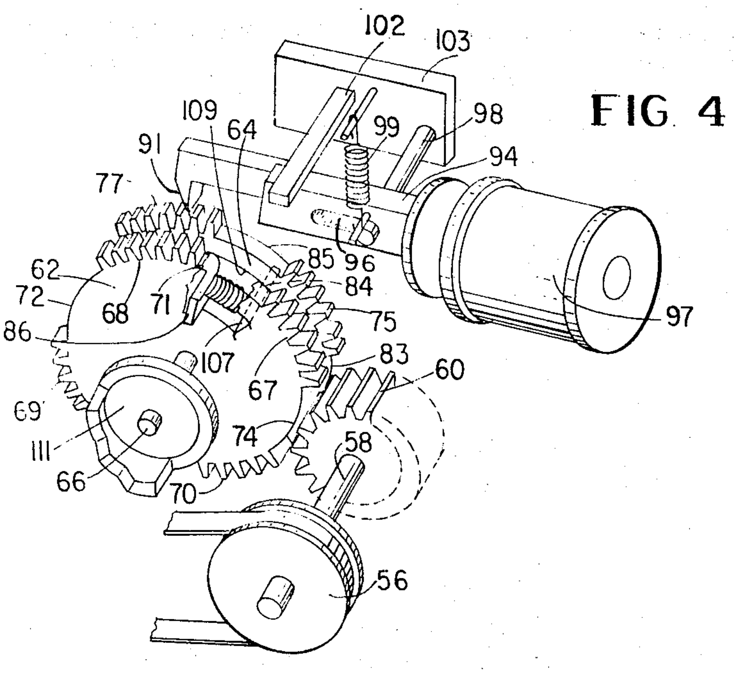
FIG. 4 is a perspective view of another embodiment of the present invention.
Figure 5:
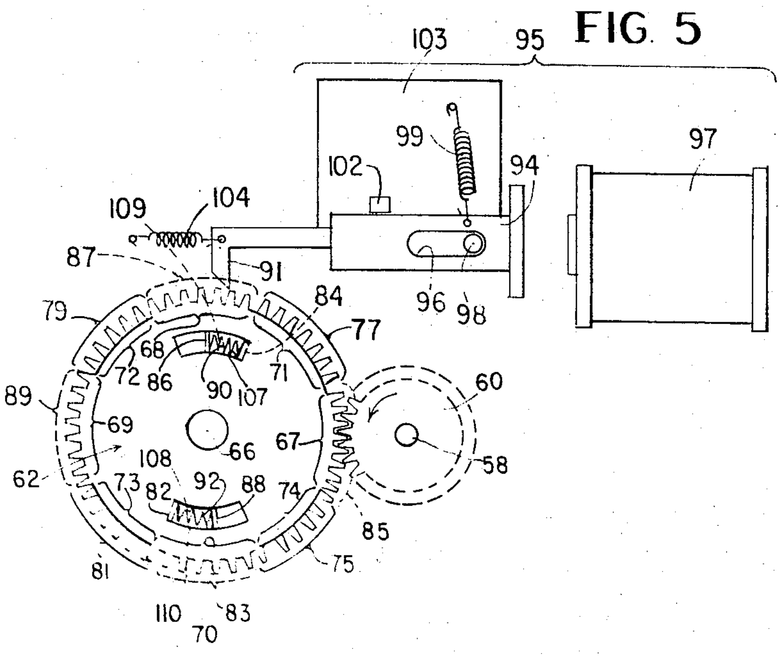
FIG. 5 is a top plan view of the embodiment of the invention shown in FIG. 4.

In FIGS. 4 and 5, like parts are given like numbers. A gear 60 is rotatably mounted on the capstan shaft 58 in a spaced relation to gears 62 and 64. Both gears 62 and 64 have meshed and unmeshed conditions with gear 60, which is continuously being driven by the flywheel 56. Gear 62 is rotatably connected to the cam shaft 66 and has alternating segments of gear teeth 67, 68, 69, 70 and recesses 71, 72, 73, 74. Gear 64, however, is not connected to the cam shaft. It is in approximate co-axially spaced relation to gear 62 in a loose fit around the cam shaft. Gear 64 has alternating sections of gear teeth 75, 77, 79, 81 and recesses 83, 85, 87, 89. Normally the number and size of the gear teeth segments and recess segments of gear 64 equals those of gear 62. Tabs 82 and 84 project inwardly from gear 62 toward gear 64, while the tabs 86 and 88 of gear 64 project outwardly toward gear 62. Windows 107 and 108 in gear 62 and windows 109 and 110 in gear 64 are provided for receiving the springs 90 and 92 which are secured to tabs 86 and 84 and 88 and 82 respectively. Gear 64 is turned by actuating means 95 with gear 62 and the cam shaft 66 remaining inactive. The springs 90 and 92 are compressed with the teeth 75 of gear 64 engaging gear 60 and rotating clockwise. The compression of the springs 90 and 92 eventually overcomes the inertia of gear 62 with the tabs effectively abutting against each other, tab 86 with tab 84, and tab 88 with tab 82. Gear 62 then rotates in the same direction and in conjunction with gear 64 and a gear tooth segment 67 of gear 62 engages gear 60. Gear 64 then continues engagement with gear 60 until a recessed portion 85 of gear 64 is reached (FIG. 5). Upon reaching the recessed portion gear 64 is no longer meshed with gear 60 and stops rotating. Gear tooth segment 67 of gear 62 however continues to mesh with gear 60 until it reaches recessed segment 71, at which time it too becomes disengaged and no longer rotates. The shifting of the transducer head by the cam 111 and cam shaft 66 is complete and the apparatus is unlinked and in position for again shifting the head.

Actuating means 95 for rotating gear 64 includes a pawl 91 which engages gear teeth of gear 64 in the engaged condition. The pawl is attached to a level arm 94 which has a slot 96 slidably mounted on a pivot rod 98. A spring 99 (FIGS. 4 and 5) for returning the arm 94 to the inactive position is connected to the arm near the resting position of the pivot rod. It is connected to plate 103 at a slight angle of approximately 5° to 10° from a perpendicular to the arm 94 and biases the arm 94 against the stop 102 which, along with pin 98, is secured to a plate 103. The actuating arm 94 is activated by a small solenoid 97 causing the lever arm to slide from left to right (FIG. 4) with the slot 96 engaging pivot pin 98 and spring 99 causing the level arm to pivot on pivot pin 98 with pawl 91 engaging the teeth 77 of gear 64. Upon disengagement of the solenoid the lever arm is returned to its original position by spring 99, thus readying the apparatus for again shifting the transducer head.

A second spring 104 shown in FIG. 5 can be added to more positively return the actuating arm to the inactive position with the solenoid 97 turned off.

What has been disclosed then, is an efficient compact apparatus which utilizes the capstan flywheel device of a multi-track tape recorder and/or reproducer for shifting the transducer head from one tape track to another thereby reducing the amount of electrical power manually used for similar types of head shifting apparatus.

I claim:

1. A multi-track tape player apparatus for shifting the transducer head from one tape track to another including in combination, a capstan flywheel drive having a capstan drive shaft;

first gear means secured to said capstan drive shaft for rotation therewith by said flywheel drive;

actuating means pivotally mounted in said player apparatus and having engaged said disengaged conditions;

second gear means rotatably mounted to said actuating means, said actuating means being responsive to a predetermined event to engage said second gear means to said first gear means whereby the same are both rotated by said flywheel drive;

cam means for shifting the position of the transducer head from one tape track to another;

third gear means secured to said cam means for rotating said cam means, said second gear means linking said third gear means to said first gear means for a first given portion of rotation of said first gear means by said flywheel drive;

first means being responsive to the completion of rotation of said first gear means through said first driven portion to disconnect said second gear means from said first gear means with said third gear means connected directly to said first gear means; and second means being responsive to the rotation of said first gear means through a second given portion to disconnect said first gear means from said third gear means thereby positioning the transducer head at the next track on the tape and readying the apparatus for subsequent shifting of this transducer head.

2. A multi-track tape player according to claim 1 wherein said second gear means includes an actuating arm pivotally mounted in said tape player and having engaged and disengaged conditions, two gears rotatably mounted to said actuating arm in driving engagement with one another, said two gears linking said first gear means to said third gear means through said first portion of rotation of said first gear means with said actuating arm in said engaged condition, and said two gears being unlinked from said first and third gear means through said second portion of rotation of said first gear means with said actuating arm in said disengaged condition.

3. In a multi-track tape player apparatus for shifting the transducer head from one tape track to another including in combination:

a capstan flywheel drive having a capstan drive shaft;

first and second gear means secured to said capstan drive shaft for rotation therewith by said flywheel drive;

an actuating arm pivotally mounted in said player apparatus and having engaged and disengaged conditions;

means for activating said actuating arm in response to a predetermined event;

third and fourth gear means rotatably mounted to said actuating arm in driving engagement with one another, said third gear being driven by said second gear in said engaged condition of said arm and in said disengaged condition thereof being disconnected from said second gear;

cam means for shifting the position of the transducer head from one tape track to another;

fifth gear means rotatably connected to said cam means and having alternate segments of tabs and gear teeth along its periphery, said gear teeth of said fifth gear meshing with said fourth gear and driving said cam means with said arm in said engaged condition until said tabs contact said fourth gear thereby returning said actuating arm into said disengaged condition;

sixth gear means having a plurality of gear segments spaced about the periphery thereof and being rotatably connected to said cam means, a gear segment of said sixth gear means being driven by rotation of said fifth gear means into mesh with said first gear means, said first gear means driving said sixth gear means through said segment to position the transducer to the next tape track, said sixth gear means being disconnected from said gear segment readying the apparatus to further position the transducer.

4. Apparatus according to claim 3 wherein said means for activating said actuating arm comprises a solenoid having a spring loaded locking rod along the axis of said solenoid and being drawn to said solenoid with said solenoid being activated, said locking rod in said locked position preventing said actuating rod from pivoting to said engaged conditon, said solenoid being activated only to withdraw said locking rod to unlock said actuating arm to permit said actuating arm to pivot and block said locking rod with the same being withdrawn.

* * * * *